United States Patent [19]

Rice

[11] Patent Number: 5,404,643
[45] Date of Patent: Apr. 11, 1995

[54] METHOD OF MONITORING THREADED FASTENER TIGHTENING OPERATIONS

[75] Inventor: Edwin E. Rice, Ann Arbor, Mich.

[73] Assignee: Ingersoll-Rand Company, Woodcliff Lake, N.J.

[21] Appl. No.: 297,524

[22] Filed: Aug. 29, 1994

Related U.S. Application Data

[62] Division of Ser. No. 49,471, Apr. 20, 1993.

[51] Int. Cl.$^6$ .................................................. B23Q 17/00
[52] U.S. Cl. ................................. 29/898.09; 29/407; 73/761
[58] Field of Search ................ 29/407, 456, 525.1, 29/705, 898.07, 898.09; 173/1, 176, 181, 182, 183; 73/761, 826.23, 826.24

[56] References Cited

U.S. PATENT DOCUMENTS

| | | |
|---|---|---|
| 3,962,910 | 6/1976 | Spyridakis et al. |
| 4,095,325 | 6/1978 | Hashimoto et al. ............ 29/407 |
| 4,102,182 | 7/1978 | Brown et al. |
| 4,104,778 | 8/1978 | Vliet ............................ 29/407 |
| 4,106,176 | 8/1978 | Rice et al. |
| 4,211,120 | 7/1980 | Tambini |
| 4,280,380 | 7/1981 | Eshghy |
| 4,333,220 | 6/1982 | Aspers |
| 4,365,402 | 12/1982 | McCombs et al. ............ 29/407 |
| 4,400,785 | 8/1983 | Wallace et al. |
| 4,620,450 | 11/1986 | Yamaguchi .............. 73/862.23 |
| 4,685,050 | 8/1987 | Polzer et al. |
| 4,906,980 | 3/1990 | Fukuhara ..................... 29/407 |
| 4,969,105 | 11/1990 | Gaenssle |
| 5,152,046 | 10/1992 | Abe ............................. 29/407 |

FOREIGN PATENT DOCUMENTS

132426 8/1983 Japan.

*Primary Examiner*—Mark Rosenbaum
*Assistant Examiner*—David P. Bryant
*Attorney, Agent, or Firm*—Walter C. Vliet; Robert F. Palermo

[57] ABSTRACT

A crankshaft bearing inspection system for confirming the presence of bearing inserts and the proper amount of bearing crush during assembly of reciprocating machines accomplished by measuring a fastener tension related function and a function fastener rotation, and evaluating the curves thus obtained to confirm and identify a characteristic signature of the bearing presence as, for example, a first constant rate of tension increase followed by a second increased constant rate of tension increase falling within expected inspection limits.

11 Claims, 3 Drawing Sheets

METHOD OF MONITORING THREADED FASTENER TIGHTENING OPERATIONS

This is a Division of application Ser. No. 08/049,471, filed Apr. 20, 1993.

BACKGROUND OF THE INVENTION

This invention generally relates to assembly of machines, and more particularly it relates to automated assembly and inspection of split shell bearing inserts as used in internal combustion engine crankshafts or the like.

In reciprocating engines, for example, the crankshafts are normally supported by main bearings which are of the split shell type. In addition, the connecting rod to crankpin journals on the crankshaft also have similar bearings.

When these machines are assembled, it is important to assure that there are no defects in the bearing to crankshaft assembly. These defects include missing bearing inserts, oversize inserts, undersize inserts, oversize bearing bores, and undersize bearing bores. Oversize bearing housing bore and undersize bearing housing bore and/or undersize inserts and oversize inserts can lead to a loose or tight bearing fit to the engine block or connecting rod. In any case, the machine would experience early failure due to bearing fit defect or missing bearing.

At present, a common method of inspecting for these defects is to visually examine during the assembly for the presence of the bearing insert. It is also common for tightening values of the fasteners to be are checked automatically at time of assembly. Torque values by themselves do not give indication that bearing shells are installed or indication of problem bearing fit. This method, therefore, has the disadvantage of requiring a secondary operation for inspection after assembly. A disadvantage of visual inspection is the difficulty of seeing the edges of the assembled bearing in the crankshaft assembly. This may make detection of a missing insert very difficult and time-consuming.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

It is an object of this invention to provide a means for automatic inspection and/or control of a mechanical assembly operation during the installation of threaded fasteners using the distinctive features of the fastener tightening behavior.

It is an object of this invention to provide a means for automatic inspection of crankshaft bearing assemblies using the distinctive features of the fastener tightening behavior.

It is a further object of this invention to provide such inspection method without regard to sequence of fastener tightening or pretorque value, if any.

In one aspect of the present invention this is accomplished by providing a method of inspecting bearing assemblies comprising measuring a tension related variable characteristic of the tightening sequence of the bearing assembly; simultaneously measuring a rotation related variable and determining a rate of rise of a tension related variable; determining a first constant rate of rise of tension related variable associated with bearing insert deformation, and a second constant rate of tension related variable rise associated with continued fastener tightening, and the point of start of a second constant rate; and determining if the point of start of the second constant rate falls within prescribed limits of the tension related variable and the rotation related variable.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
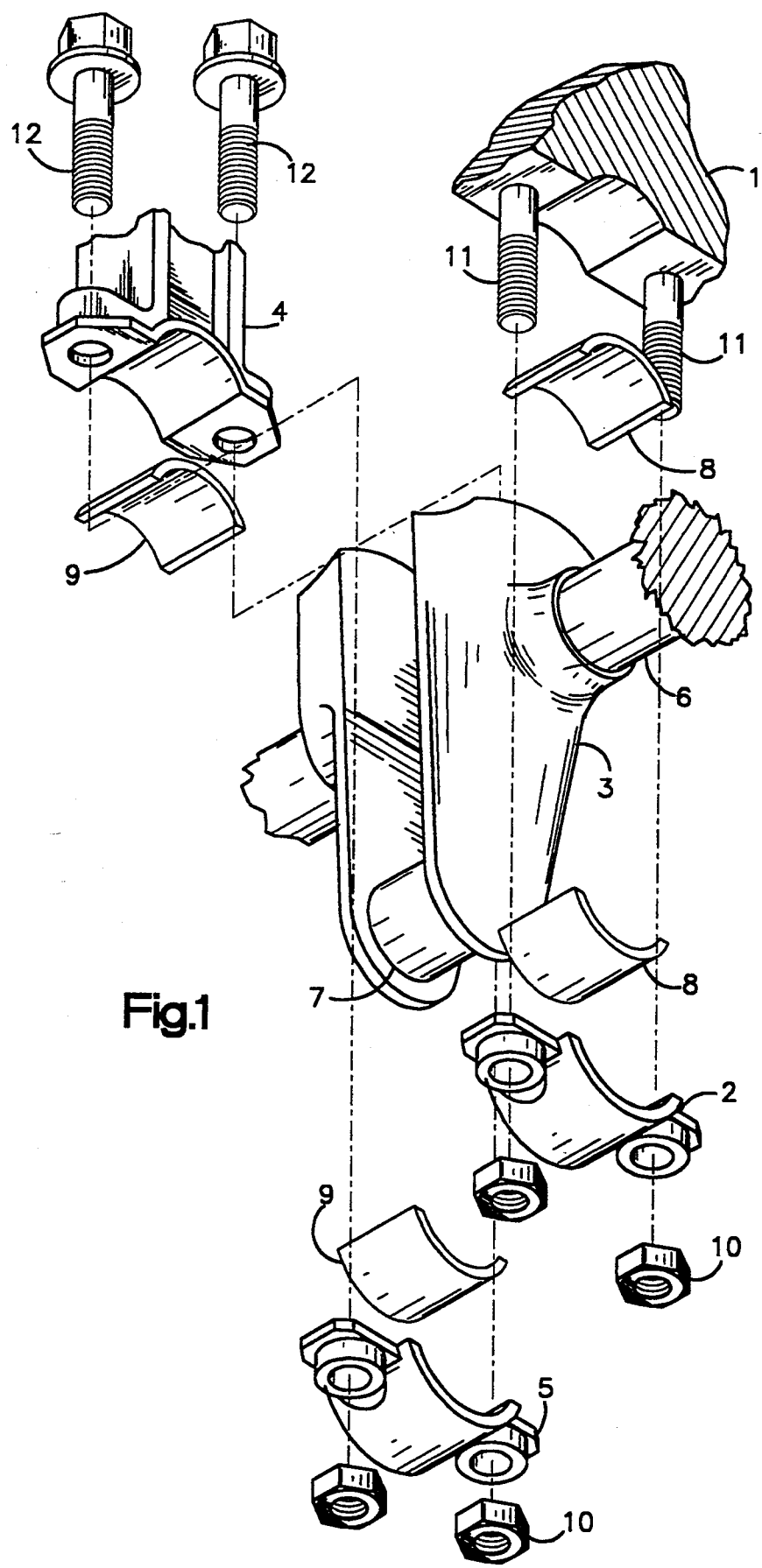
FIG. 1 is an exploded perspective fragmentary view of a crankshaft showing a main bearing journal with cap and a connecting rod bearing with cap.

FIG. 1 shows a portion of a machine frame in the form of an engine block 1, a main bearing cap 2, connecting rod 4, connecting rod bearing cap 5, main bearing journal 6, crankpin journal 7, main bearing insert 8, connecting rod bearing insert 9, fastener nut 10, crankshaft 3, main bearing fastener or studs 11, and connecting rod bearing bolts 12.

During assembly, the main bearing journals 6 on the crankshaft 3 are placed in the saddles on the machine frame 1 and are held in place by the main bearing caps 2 placed over the ends of the main bearing studs 11 and secured in place by fastener nuts 10.

Similarly, the connecting rods 4 are placed upon the crankpin journals 7 on crankshaft 3 and are held in place by connecting rod bearing caps 5 which are secured by fastener nuts 10 on connecting rod fastener or bolts 12.

Main bearing insert sets 8 are interposed between engine block 1, main bearing caps 2, and the main bearing journals 6 of crankshaft 3. Connecting rod inserts 9 are likewise interposed between connecting rods 4, connecting rod bearing caps 5, and crankpin bearing journals 7. These inserts are typically made from steel strip coated with a thin bearing metal layer.

The main bearing saddle and cap as well as the connecting rod and connecting rod bearing cap are precision bored to accommodate the precision bearing shell inserts.

The uninstalled outer diameter of a split bearing shell insert set is slightly larger than the diameter of the bore into which it fits. As the bolts in the bearing cap are tightened during assembly, the insert diameters are sized down in a process commonly called bearing crush. For an automobile engine, bearing crush is typically 0.003" to 0.004" in diameter. The seating and crushing of the bearings causes distinctive torquing behavior because this occurs before the bearing caps seat solidly against the opposite half of the bearing housing.

Because of their fabrication from steel strip, the bearing inserts are subject to minor deformations and distortions. In addition, manufacturing tolerances and assembly practice including cleanliness, etc., can cause an imprecise fit on the main bearing journals and the crankpin journals.

In order to assure a tight fit between bearing inserts and bearing housing, the bearing inserts are routinely manufactured to be slightly larger in diameter than the bore into which they fit. This, then, requires a sizing or crushing of bearing inserts during the fastener tightening operation. This crushing action cause the bearing insert to conform closely to the bore of the cap and saddle of both the main bearing and the connecting rod bearing.

This conformity and tight fit is important to the function of the bearing crankshaft assembly to prevent bearing insert rotation in the housing and to dissipate heat. The bearing insert also accommodates the flow of lubricating oil to the bearing and journal surfaces. Any dimensional discrepancy may result in either insufficient lubrication or improperly distributed lubrication. In a sliding bearing joint such discrepancies cannot be tolerated and therefore the assembly process must insure the insert is properly installed and that it has received the designed amount of bearing crush during installation.

This is possible, in situations such as the foregoing crankshaft bearing assembly operation example by identifying the incipient point of a change in slope of a first fastener tightening related value compared to a second fastener tightening related value. Thereafter, one or more of the following values may be utilized, either singularly or in combination, to generate assembly inspection parameters and/or on-going fastener tightening control parameters: the first tightening related value where the first value is proportional to torque (tension) on the fastener and the second related value is proportional to rotation of the fastener; and/or the second tightening related value at the incipient point; and/or the slope of the two values before the incipient point; and/or after the incipient point and the two fastener tightening related values at the incipient point.

Figure 2:
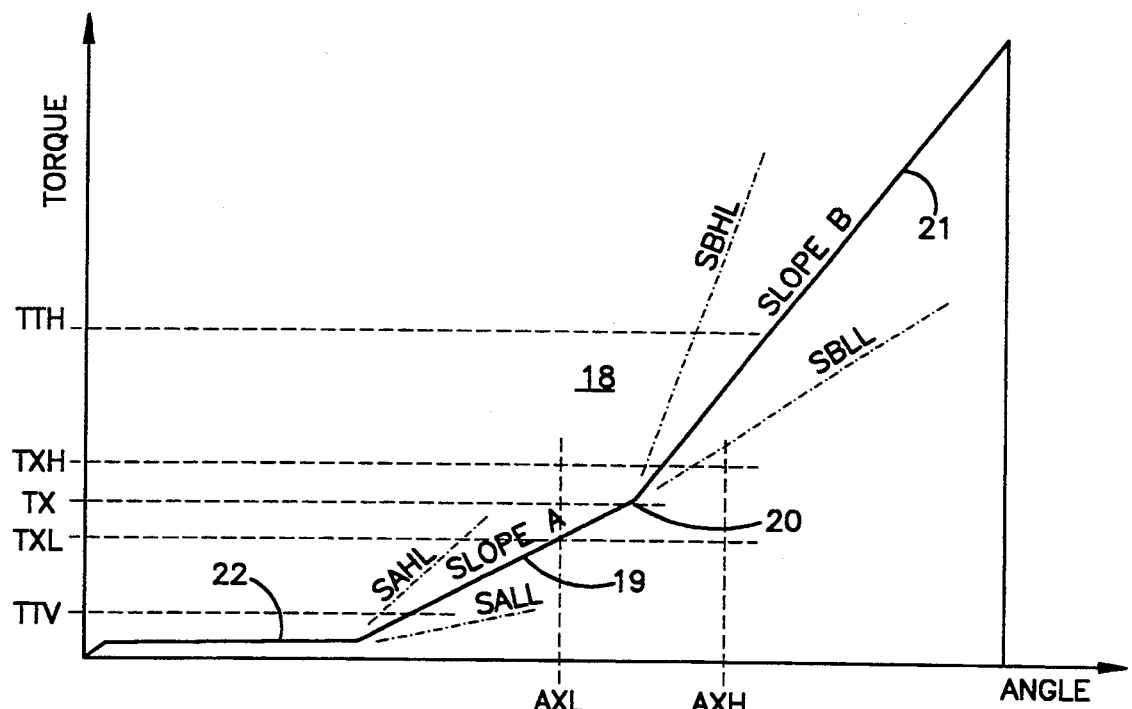
FIG. 2 is an idealized torque vs. angle curve drawn to illustrate the low slope bearing crush portion of the curve, the knee of the curve, and the high slope bolt tightening portion of the curve.

Referring to FIG. 2, when the tightening torque or other tension related function of a threaded fastener is plotted as a function of fastener turning angle or other rotation related function, such as time for a constant rotation, a characteristic curve is generated which can be used to evaluate the assembly.

During bearing crush, the slope of the torque vs. angle curve is much lower than it is after the cap is firmly seated to its mating half. The resultant knee in the curve occurs at a torque value which is a function of the amount of bearing crush experienced and the tightness of the opposite bolt on the cap. Since both cap bolts share in loading the cap, for a given amount of bearing crush, the torque value of the knee is directly proportional to the tightness of the opposite bolt up to the point where the bearing cap joint associated with the opposite bolt remains in firm contact as the bolt being tightened reaches the knee of the curve.

It should be understood that bearing crush is a direct proportion of the total angle of fastener rotation of both fasteners once both the fasteners have reached a snug contact point where the bearing cap is in firm contact with the bearing shells. If one of the fasteners is snugged first and stopped sufficient to keep the joint associated with that fastener in firm contact, then the second fastener will perform most of the bearing crush. If both fasteners reach snug point at the same time, bearing crush would result from some of the rotation of both fasteners. For this reason, it is important to know or control the fastener tightening sequence of all fasteners in any one bearing cap that has occurred in order to evaluate bearing containing joints.

When the crankshaft journals, the bores, and the bearing inserts are properly matched, the torque vs. angle curves will be reproducible within a fairly narrow range of values.

This reproducibility of the torque vs. angle curve makes it possible to detect the most common defects in the bearing to crankshaft assemblies, namely, missing inserts, oversize inserts, undersize inserts, oversize bearing cap, and undersize bearing cap by examining the curve.

Using the torque vs. angle curve characteristics described above, it is possible to monitor quality of the bearing assemblies by automatic means. Such automatic monitoring would provide much higher reliability than that currently available from visual or post assembly testing methods.

FIG. 2 shows a plot of torque vs. angle of fastener rotation for a typical bearing cap fastener. Curve 18 shows a low slope bearing crush portion 19 and the high slope fastener tightening portion 21. Between these two portions of the curve is a knee 20. The low slope bearing crush portion of the curve, to a greater or lesser degree, is depicted as a straight line. The degree to which the low slope portion 19 will depart from linearity depends on the degree and nature of the deformations and distortions that exist in the insert set. As these distortions and discrepancies are forced to conform to the bearing saddle and cap, the torque vs. angle curve will show the rising level as seen in the figure.

In the initial tightening of a split shell bearing assembly where bearing crush is a factor, the first excursion of the torque vs. angle curve is due to the essentially elastic deformation of the bearing shells and the fastener(s).

The knee 20 (incipient point) occurs at the point where the bearing crush is complete and all remaining excursion of the torque vs. angle curve is due to the elastic deformation of the fastener, the bearing shells, and the bearing housing. The straight line proportional characteristic of this portion of the curve is well known in the art. In tightening a two fastener bearing cap, the knee only occurs in the curve generated during tightening the second fastener (unless simultaneous) because, during the tightening of the first fastener, the bearing inserts are free to slide within the bore of the assembly. Thus, when tightening the first fastener, the inserts can rotate slightly to accommodate some of the pressure that is being applied. Once the first fastener is tightened, however, the tightening of the second fastener will almost immediately begin to distort or crush the bearing inserts. This is reflected in the low slope torque vs. angle behavior which reflects the lower stiffness or spring rate of the fastener and bearing inserts only.

It is clear that, for a given bearing insert set coupled with a given saddle and cap set, a certain degree of bearing crush will occur. If the bolts are tightened sequentially in any order, the first bolt(s) tightened on one side of a bearing cap will have no knee (at a significant torque value). A FIG. 2 type curve will be generated for whichever bolt or fastener is tightened second in sequence. If both bolts were tightened simultaneously or essentially simultaneously, the bearing crush would be reflected by knees in both curves at some intermediate torque and angle value, namely some value lower than the knee of the curve when the bolts are tightened sequentially. This intermediate value will be proportional to the value at the sequentially generated knee such that the total torque observed in the two curve knees will be representative of the total bearing crush experienced. This proportionality permits the inspection of degree of bearing crush by observing the torque angle curve trace and the torque value at which the knee occurs.

If no knee is observed in either the first or second bolt curve trace or the simultaneous curve traces, it indicates that the bearing insert has been omitted from the joint or that their fit is incorrect. This is another criterion of the quality of the assembly.

For each bearing assembly design there is a characteristic torque vs. angle relationship which can be used to inspect the quality of the assembly. This inspection can reveal such defects as missing bearing inserts, insufficient or excessive bearing crush, undersize bearing housing bore and oversize bearing housing bore.

An example, again referring to the split shell bearing assembly, of using the incipient point values to determine the tightening control parameters during the second constant rate phase is described in the following:

Engine bearing housings for connecting rods and main bearings are assembled for machining the bores previous to final assembly with the crankshaft. The cap halves of the bearing housings are secured by installing and tightening the fasteners used in final assembly. It can be seen that the spring rate of the bolted joint will be different at final assembly with the added resistance of the bearing shells than it was during the machining operation. It is desirable to maintain roundness of the bearing bore at final assembly. It can further be seen that with the higher spring rate caused by the added resistance of the bearing shells at final assembly, the bearing housing elastic deformation will be less than at the time of housing bore machining with the same tension load on the fasteners in both instances. It can also be seen that modifying (increasing) the tightening value on the bearing housing cap fasteners, base resistance introduced by the addition of bearing shells in final assembly can compensate for the loss of elastic deformation. Because bearing crush is a variable resulting from unavoidable tolerances, it is necessary to know the relative amount of bearing crush in order to compensate for this variable. A fastener tightening related value at the incipient point of the start of a second slope of the fastener tightening related value compared to a second fastener tightening related value can be used as an adaptive factor for correcting the final tightening values of the bearing cap fasteners.

In order to use these methods for bearing shell assembly, it is necessary to characterize each particular design of bearing assembly. This characterization will include but not be limited to the desired fastener tension level for the assembly at machining and at final assembly, the spring rates of the housing bolted joint with and without bearing shells and acceptable variances in tension related values in the first and second tightening phases. It will also require determination of the characteristic tightening force/tension curves for the final assembly in the first and second phase.

Once these curves have been determined and the average slope values (in foot pounds per degree of fastener rotation) have been established, the assemblies may be put together and the fasteners tightened in whatever sequence has been established for the operation. By monitoring the aforementioned curves and the tension related values at which the knee in the curves occur, it can be determined that the bearing is okay and the values are within prescribed limits. If the slope B is not within its limits, then there is indication of a faulty bearing assembly.

Also according to the present invention, the bearing housing joint final tightening can be controlled so as to compensate for variations sensed during earlier phases of the tightening operation. For example, an empirical calculation can be made at the incipient point at the end of the first constant rate using a then recorded tension related value to determine the added resistance in the joint resulting from the bearing shells and thereby modifying the final tightening point to compensate for the added resistance of the bearing shells.

Figure 3:
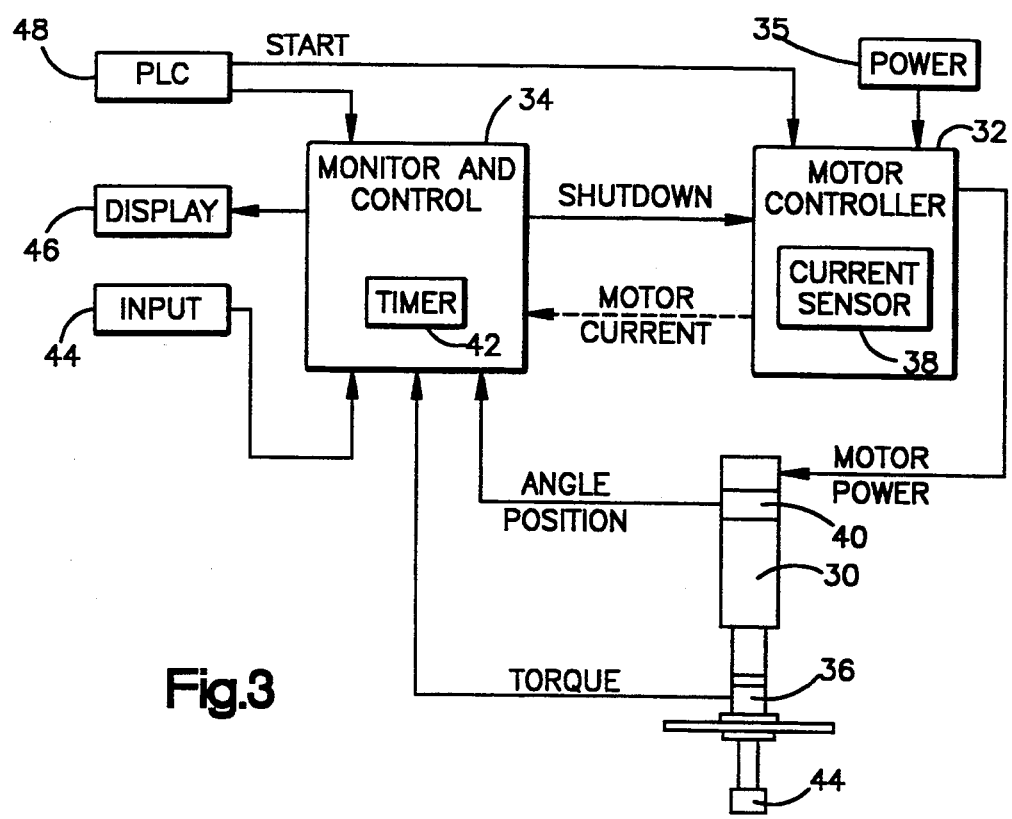
FIG. 3 is a schematic illustration of a tightening system according to the present invention.

Referring to FIG. 3, an embodiment of a power torquing system with fastener tension and rotation monitoring and control capability is shown and will be described according to the present invention. The system includes a drive unit 30, a motor control unit 32, and a monitor and control unit 34. In the embodiment described, digital processes are used for units 32 and 34, although analog devices could also be used. The drive unit 30 may be an air motor or an electric motor spindle module. The power source 35 may be high pressure air or electrical energy. Torque is transferred to the fastener by a drive socket 41 on the drive unit.

To measure a tension related variable, a torque detector 36 such as a torque transducer is provided for detecting the tightening torque applied by the drive unit. For electric motors, the tension related variable can alternatively be determined by measuring the electric current drawn by the motor since the current is proportional to the torque applied. An electric current sensor 38 can be provided in the motor control unit 32 for this purpose in the alternative use of an electric motor.

To measure a fastener rotation related variable, an angle of turn detector 40, such as an angle encoder, is provided for detecting the incremental angle turn of the fastener. Another fastener rotation related variable, the incrementally elapsed time of a torque application, may be measured using a timer 42, as an alternative, for example, in the monitor and control unit 34. The tension related variable and fastener rotation tension related variables are readily sensed since the torque applied (electrical current drawn by the motor) can be changed by lubrication or lack thereof (friction) in the joint. The fastener rotation related variable which may, for example, be angle of turn or elapsed time of torque application, is not influenced by friction, but is merely a function of the fastener thread and the mechanical properties of the fastener, the bearing, and the joint components.

The monitor and control unit 34 preferably includes a featured design to distinguish a designated torque threshold before initiating subsequent torque and tension related measurements, thus avoiding severe distortions generally associated with low torque. The system includes an input device 44, such as a hand held terminal, for entering user selectable control and monitoring perimeters into the unit 34. A display unit 46 is provided for data output. A device such as a programmable logic control 48 is used to initiate the tightening sequence and to control the order of various selectable tightenings, sequences, and functions determined by joint and user requirements.

Figure 4:
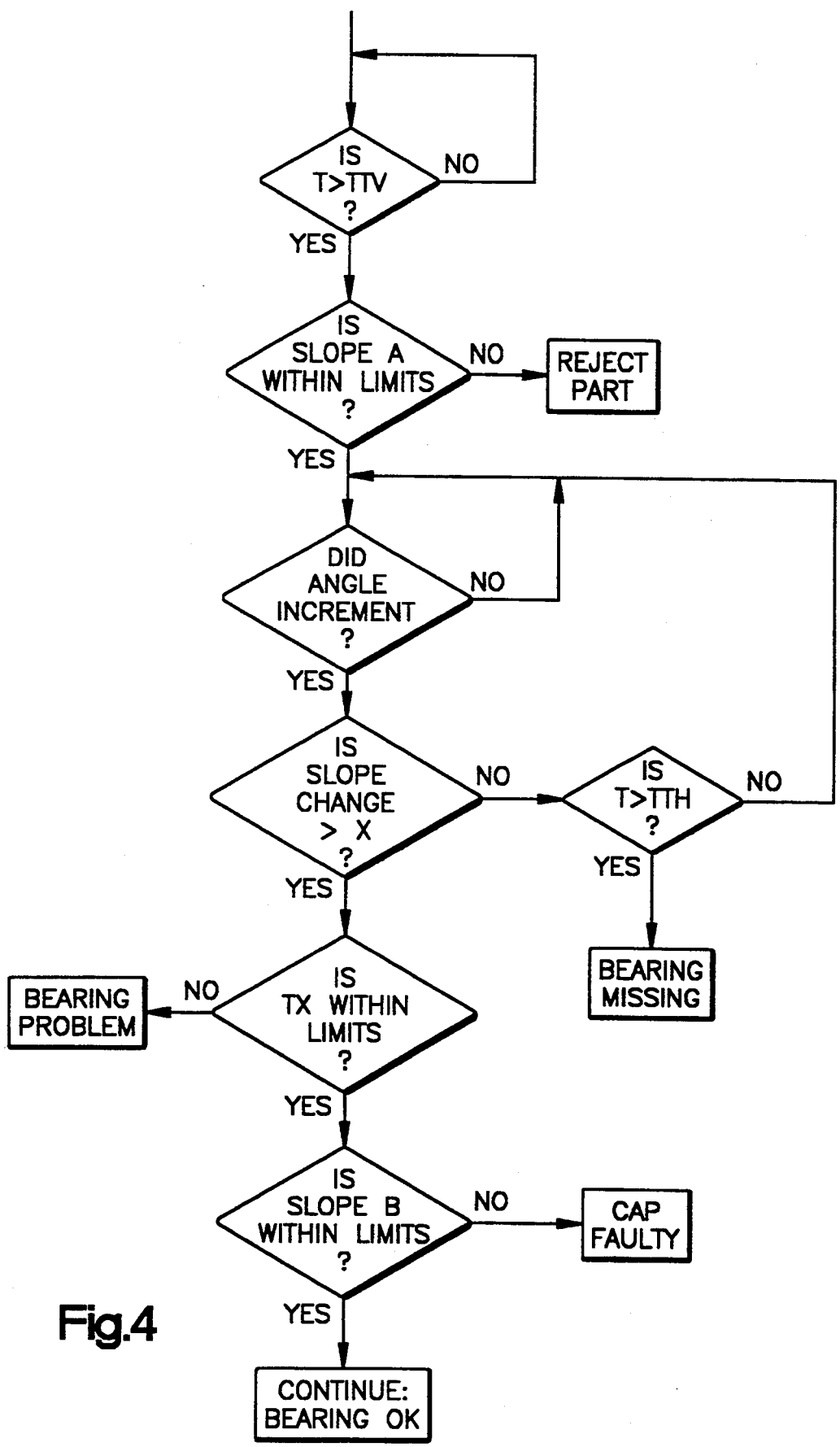
FIG. 4 is a flow chart depicting a logic sequence for a bearing installation and inspection system according to one embodiment of the present invention.

A typical bearing joint tightening operation according to the present invention is depicted, for example, in FIG. 4.

Again, referring to FIG. 2, where a typical torque angle tightening curve is shown for a bearing containing joint showing bearing crush. The relatively flat low level torque portion of the curve to the left, designated by the reference numeral 22, represents the initial rundown portion of the fastener before seating of the joint. This is shown as a straight line, however, typically it could be cyclic or compound cyclic in nature but in any event at a low level, such as indicated, unless the fastener is cross threaded or misformed, or otherwise defective.

With the joint seated and a bearing cap in place, the curve will exhibit a constant torque rise represented by the slope designated 19 or slope A in FIG. 2. This represents the constant torque rise as the bearing is "crushed" to its final seated position. Once the bearing has been fully seated and also the joint is fully seated, the tightening slope will exhibit an increase in the torque rise rate indicated by the portion of the curve designated 21 or slope B. A knee 20 is formed where the slope A and slope B intercept.

According to the present invention, the bearing joint may be inspected in the following sequence:

Referring to FIGS. 2 and 4, the bearing joint is assembled and the fasteners are run down to a low level snug point as indicated in the curve portion designated by the reference numeral 22. The tightening sequence then begins on one of the fasteners. If a bearing is present and appropriate bearing crushing takes place, the slope A portion of the curve will be established. For a given joint system the slope may be expected to fall within a lower limit and an upper limit for a proper joint. The slope, once established, is tested against an upper and lower limit, and if within the proper limits, tightening progresses. If not, the part is rejected for a missing bearing or other problems.

Slope A is continuously tested to be sure that tightening is progressing and will continue to do so until the slope change occurs at the knee 20. The slope is monitored for values greater than initial slope. If it is not, if the present torque is less than the highest allowable torque for the knee (TTH), then the angle increment test is repeated. If the torque is greater than the high torque limit for reaching the qualifying rate of change of knee 20, then the bearing crush is excessive or another defect is indicated and the part is rejected. If the change occurs within the inspection limits of a high and low torque and a low and high angle limit for the criterion point, then the slope is checked to determine whether the slope B is within a lower and an upper limit. If it is not, then there is a bearing problem or another defect and it is rejected. If the Slope B is within limits, then the bearing cap fasteners are tightened until completed and there is indication that the bearing assembly is okay. If the slope B is not within its limits until completion of tightening, then there is indication of a faulty assembly.

While I have described this invention in terms of torque values being used as the arbiters of quality of assembly, it is equally acceptable to use the angular values illustrated in the torque vs. angle curves to indicate the assembly quality. Thus, it is not intended to limit the applicability of my invention to only those cases where torque is the determinative factor in quality measurement. Instead, it is the use of the tightening curve as a quality indicator that is intended to be disclosed and claimed in this invention.

It will be obvious that torque vs. angle can be read as torque vs. fastener tension due to the inclined plane properties of threaded fasteners. Other relationships will suggest themselves to those skilled in the art.

What is claimed is:

1. A method of inspection of a threaded fastener-secured, deformable machinery joint assembly during a threaded fastener tightening operation, said method comprising:
   measuring a first tension-related variable during a tightening sequence of a fastener of said machinery joint assembly;
   simultaneously measuring a second rotation-related variable during said tightening sequence of said fastener;
   determining a tightening rate of rise in terms of the measured first variable with respect to the second variable;
   determining from said tightening rate of rise a first constant rate of rise associated with initial tightening of said fastener during said tightening sequence, and a second constant rate of rise associated with continued fastener tightening, and the point of start of said second constant rate; and
   determining if said point of start of said second constant rate falls within predetermined prescribed limits of said first tension-related variable and said second rotation-related variable for an acceptable machinery joint assembly.

2. The method according to claim 1, further comprising determining if said first constant rate of rise is within predetermined prescribed limits for initial fastener tightening for an acceptable machinery joint assembly.

3. The method according to claim 1, further comprising determining if said second constant rate of rise is within predetermined prescribed limits for continued fastener tightening for an acceptable machinery joint assembly.

4. The method according to claim 1, further comprising determining if said first constant rate of rise and second constant rate of rise are within predetermined prescribed limits for initial fastener tightening and continued fastener tightening, respectively, for an acceptable machinery joint assembly.

5. A method of controlling the assembly of threaded fastener-secured machinery during a threaded fastener tightening operation, said method comprising:
   measuring a first tension-related variable of a tightening sequence of a fastener of said machinery;
   simultaneously measuring a second variable associated with the tightening of said fastener during said tightening sequence;
   determining a tightening rate of rise in terms of the measured first variable with respect to the second variable;
   determining from said tightening rate of rise a first constant rate of rise associated with initial tightening of said fastener during said tightening sequence, and a second constant rate of rise associated with continued fastener tightening, and the point of start of said second constant rate; and
   modifying parameters controlling continued fastener tightening based upon the point of start of second constant rate to ensure proper assembly of said machinery.

6. The method according to claim 5, wherein said first constant rate of rise is also used to modify parameters controlling said continued fastener tightening.

7. The method according to claim 5, wherein said second constant rate of rise is also used to modify parameters controlling said continued fastener tightening.

8. The method according to claim 5, wherein said fastener is tightened using a tool powered by an electric motor, and said tension-related variable is current applied to the motor during said tightening sequence of said fastener.

9. A method of inspecting a threaded fastener-secured engine bearing assembly for the presence of split bearing shells, said method comprising:

measuring a first tension-related variable of a tightening sequence of a fastener of said engine bearing assembly;

simultaneously measuring a second variable associated with the tightening of said fastener during said tightening sequence;

determining a tightening rate of rise in terms of the measured first variable with respect to the second variable;

determining from said tightening rate of rise a first constant rate of rise associated with initial tightening of said fastener during said tightening sequence; and determining bearing shell presence by monitoring for a second rate of rise associated with continued fastener tightening that is at least a predetermined amount greater than said first constant rate of rise.

10. The method according to claim 9, wherein bearing shell presence is further verified by determining if said first constant rate of rise is within predetermined limits for initial fastener tightening.

11. The method according to claim 9, wherein bearing shell presence is further verified by determining if the incipient of said second rate of rise is within predetermined limits for said first and second variables.

* * * * *